(12) United States Patent
Nitta

(10) Patent No.: US 10,183,827 B2
(45) Date of Patent: Jan. 22, 2019

(54) ELASTIC BODY ROLLER

(71) Applicant: Sato Holdings Kabushiki Kaisha, Tokyo (JP)

(72) Inventor: Haruhiko Nitta, Tokyo (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 129 days.

(21) Appl. No.: 15/457,591

(22) Filed: Mar. 13, 2017

(65) Prior Publication Data

US 2017/0183184 A1    Jun. 29, 2017

Related U.S. Application Data

(60) Division of application No. 14/672,505, filed on Mar. 30, 2015, which is a continuation of application No. PCT/JP2013/078156, filed on Oct. 17, 2013.

(30) Foreign Application Priority Data

Oct. 19, 2012 (JP) ................................ 2012-231693
Feb. 28, 2013 (JP) ................................ 2013-038486

(Continued)

(51) Int. Cl.
*B65H 27/00* (2006.01)
*B65C 9/18* (2006.01)
(Continued)

(52) U.S. Cl.
CPC .............. *B65H 27/00* (2013.01); *B41J 11/04* (2013.01); *B65C 9/1803* (2013.01); *B65G 39/07* (2013.01);
(Continued)

(58) Field of Classification Search
CPC ........ B65H 2404/532; B65H 2404/185; B65H 2404/5391; B65H 27/00
(Continued)

(56) References Cited

U.S. PATENT DOCUMENTS 4,804,576 A    2/1989  Kuge
4,837,064 A    6/1989  Tschudin-Mahrer
(Continued)

FOREIGN PATENT DOCUMENTS

EP    2 305 482 B1    4/2011
EP    3 056 349 A1    8/2016
(Continued)

OTHER PUBLICATIONS

International Search Report dated Jan. 7, 2014 issued in corresponding International patent application No. PCT/JP2013/078156.
(Continued)

*Primary Examiner* — Jason L Vaughan
(74) *Attorney, Agent, or Firm* — Ostrolenk Faber LLP

(57) ABSTRACT

An elastic body roller which has an excellent non-stick property or release property, and frictional force (gripping force) and is able to stably feed and guide a belt-shaped member such as a linerless label, a typical liner label, or the like is provided. Attention has been paid to coating an outer layer of an inner layer elastic material member having a silicone resin (a outer layer elastic material member) with a C hardness (hardness by a spring-type Asker C type defined in the SRIS 0101 standard) set low. An elastic material member of an elastic body roller has an inner layer elastic material member provided on the outer periphery of a roller shaft, and a outer layer elastic material member provided on the outer periphery of the inner layer elastic material member and being in contact with a belt-shaped member, and the
(Continued)

outer layer elastic material member is formed from a silicone resin with a C hardness of 20 degrees or less.

12 Claims, 8 Drawing Sheets

(30) Foreign Application Priority Data

Oct. 7, 2013 (JP) ................................ 2013-210179
Oct. 7, 2013 (JP) ................................ 2013-210180

(51) Int. Cl.
*B41J 11/04* (2006.01)
*B65G 39/07* (2006.01)

(52) U.S. Cl.
CPC .... *B65H 2401/113* (2013.01); *B65H 2401/13* (2013.01); *B65H 2404/1313* (2013.01); *B65H 2404/13161* (2013.01); *B65H 2404/161* (2013.01); *B65H 2404/185* (2013.01); *B65H 2404/251* (2013.01); *B65H 2404/532* (2013.01); *B65H 2404/5391* (2013.01); *B65H 2701/192* (2013.01); *B65H 2801/12* (2013.01)

(58) Field of Classification Search
USPC ........................................ 492/30, 33, 35, 36
See application file for complete search history.

(56) References Cited

U.S. PATENT DOCUMENTS

| | | | |
|---|---|---|---|
| 4,842,944 A | 6/1989 | Kuge | |
| 4,960,050 A | 10/1990 | Hatch | |
| 5,458,324 A | 10/1995 | Nakamura | |
| 5,753,348 A | 5/1998 | Hatakeyama | |
| 5,779,370 A | 7/1998 | Schroeder et al. | |
| 6,163,669 A | 12/2000 | Aoki | |
| 6,273,415 B1 | 8/2001 | Tengo | |
| 6,485,878 B2 | 11/2002 | Nagase | |
| 6,645,297 B1* | 11/2003 | Suzuki | B05C 1/0808 118/110 |
| 6,703,094 B2 | 3/2004 | Kakii | |
| 6,766,738 B2 | 7/2004 | Blumm | |
| 6,971,946 B2 | 12/2005 | Suzuki | |
| 7,448,610 B2 | 11/2008 | Ito | |
| 7,493,066 B2* | 2/2009 | Aruga | G03G 15/10 399/239 |
| 7,493,074 B2 | 2/2009 | Komuro | |
| 7,689,154 B2 | 3/2010 | Asakura | |
| 8,379,071 B2 | 2/2013 | Katayama | |
| 8,483,597 B2 | 7/2013 | Mimbu | |
| 8,714,085 B2 | 5/2014 | Kolbe | |
| 2005/0050729 A1* | 3/2005 | Suzuki | B24B 1/00 29/895.32 |
| 2005/0119097 A1* | 6/2005 | Nishimori | B41J 13/02 492/56 |
| 2007/0012549 A1* | 1/2007 | Kanaris | B65G 39/02 198/835 |
| 2010/0036005 A1 | 2/2010 | Sasagawa et al. | |
| 2011/0194880 A1 | 8/2011 | Ogawa et al. | |
| 2011/0211034 A1 | 9/2011 | Katayama | |
| 2016/0200473 A1 | 7/2016 | Nitta | |

FOREIGN PATENT DOCUMENTS

| | | |
|---|---|---|
| JP | 60-130648 | 7/1985 |
| JP | S63-208465 | 8/1988 |
| JP | 6-1510 | 1/1994 |
| JP | 8-91614 | 4/1996 |
| JP | 2000-505012 | 4/2000 |
| JP | 2002-116608 | 4/2002 |
| JP | 2004-184704 | 7/2004 |
| JP | 2005-231218 | 9/2005 |
| JP | 2011-31426 | 2/2011 |
| JP | 2011-164178 | 8/2011 |

OTHER PUBLICATIONS

Search Report dated Nov. 8, 2016 issued in corresponding European Patent Application No. 13847457.2.

* cited by examiner

ELASTIC BODY ROLLER

CROSS REFERENCE TO RELATED APPLICATIONS

The present application is a divisional under 37 C.F.R. § 1.53(b) of prior U.S. patent application Ser. No. 14/672,505, filed Mar. 30, 2015, which in turn is a continuation of PCT International Application Ser. No. PCT/JP2013/078156, filed Oct. 17, 2013, which claims priority to Japanese Patent Application No. 2012-231693, filed Oct. 19, 2012, Japanese Patent Application No. 2013-038486, filed Feb. 28, 2013, Japanese Patent Application No. 2013-210179, filed Oct. 7, 2013 and Japanese Patent Application No. 2013-210180, filed Oct. 7, 2013. The contents of each of these applications are incorporated in full by reference herein.

TECHNICAL FIELD

The present invention relates to an elastic body roller such as a planten roller or a nip roller that feeds a belt-shaped member such as a linerless label or a typical label with liner.

BACKGROUND ART

Conventionally, a linerless label has been developed that lacks a release paper (i.e., a liner) temporarily attached to a back surface side of an adhesive agent layer of a label (see, Patent Literature 1: JP-A: 2011-31426). Accordingly, a linerless label is thought to be desirable as a resource-saving material because a liner does not need to be disposed of after usage thereof.

FIG. 11 shows a perspective view of one embodiment of a conventional linerless label wound into a rolled shape. The linerless label, as partially indicated in an enlarged cross-sectional view in FIG. 11, includes a label substrate, an adhesive agent layer of a back surface side; a thermosensitive color developing agent layer of a front surface side; and a transparent release agent layer of an upper layer side.

FIG. 12 shows a loaded linerless label. FIG. 12 shows a schematic side view of a thermal printer.

A roller composed of an elastic body such as a rubber material may be used in a planten roller for feeding and printing the linerless label in the abovementioned construction. A platen roller composed of an adhesive agent attachment preventing a silicone rubber material is formed and a silicone oil or the like is applied onto an outer peripheral surface of the platen roller in order to prevent the attachment by the adhesive agent of the adhesive agent layer.

However, it is difficult to completely prevent attachment of the adhesive agent during a long period of usage. The linerless label that passes through the platen roller may become rolled up and attached to the platen roller. Accordingly, the label can become stuck, which may interfere with normal feeding of label, printing, and the issuance of the label piece.

In addition, in a case where printing and issuance ceases with the linerless label sandwiched between a thermal head and the planten roller, the linerless label does not readily peel away from the platen roller, and thus a rolled up linerless label is easily generated.

Thus, typical maintenance such as an operation that cleans an outer peripheral surface of the planten roller or an operation that exchanges the planten roller, or the like, must be repeated. Accordingly, there has been a need for the planten roller (elastic body roller) allowing stable feeding and printing over an extended period of time.

Moreover, in addition to the planten roller, there has also been a need for an elastic body roller for a label superior in an anti-stick property or a release property (mold release property), even as a roller for simple guidance of linerless label such as a guide roller, or a nip roller comprising a pair of rollers that are rotatably driven to feed the linerless label or a roller, where appropriate for a construction of a printer.

Further, there has also been a need for an elastic body roller for a label that can stably feed a loaded linerless label or loaded typical label with liner.

While attempts have been made to form a groove or the like on an outer surface of the planten roller in order to avoid an attachment phenomenon resulting from the adhesive agent layer by decreasing a contact surface area between the linerless label and the adhesive agent layer, the contact surface area between the back surface of the liner of the label is unable to exert the required a liner of frictional force (gripping force) between the liner at a time of feeding and printing of a typical label with liner, such that problems with a feeding function that generates a label readily occur such as slippage. Accordingly, a stable feeding or printing action cannot be expected.

In addition, a groove or the like that is formed on the platen roller may also be easily worn down.

Similar to the abovementioned linerless label, the abovementioned various problems occur even in a case where feeding or guiding a belt-shaped member of a film base or a paper including a bonding agent layer or an adhesive agent layer on the back surface side, and thus there is a need for an elastic body roller superior in an anti-stick property or a release property (mold release property).

BRIEF SUMMARY OF INVENTION

The present inventors discovered an elastic body roller that includes an inner layer elastic material member disposed on an outer periphery of the roller shaft and an outer layer elastic material member composed of a silicone resin having a C hardness of 20 degrees that is in contact with the belt-shaped member disposed on an outer periphery of the inner layer elastic material member in order to solve the various abovementioned problems.

A first embodiment of the present disclosure describes an elastic body roller for feeding a belt-shaped member, the elastic body roller comprising:

a roller shaft; and an elastic material member surrounding the roller shaft, the elastic material member configured to feed the belt-shaped member by making contact with the belt-shaped member, the elastic material member including:

an inner layer elastic material member disposed on an outer periphery of the roller shaft, and an outer layer elastic material member disposed on an outer periphery of the inner layer elastic material member, the outer layer elastic material member configured to make contact with the belt-shaped member, and the outer layer elastic material member being formed from a silicone resin having a hardness of 20 degrees or less based on a spring type hardness tester Asker C in accordance with SRIS 0101.

An elastic body roller according to the present description includes the inner layer elastic material member disposed on the outer periphery of the roller shaft and the outer layer elastic material member composed of a silicone resin having a C hardness of 20 degrees that is in contact with the belt-shaped member disposed on the outer periphery of the inner layer elastic material member. A outer layer elastic material member composed of the silicone resin having a low hardness allows the silicone resin to have both a non-stick property or a release property with respect to the adhesive agent layer and the frictional force (gripping force) and anti-wear property necessary with respect to the belt-shaped member as a result of a gelated resin having the low hardness (C hardness of 20° C. or lower). Accordingly, the belt-shaped member such as the linerless label and the typical label with a liner may be stably fed and guided.

BRIEF DESCRIPTION OF DRAWINGS

FIG. 8 shows an essential part side view as seen from a feeding direction of a linerless label 1 of the planten roller 120 (see, FIG. 6) and thermal head 16 in a thermal printer 8 (see, FIG. 12) or the like;

DETAILED DESCRIPTION OF INVENTION

A first embodiment of a present disclosure describes that an elastic body roller has been provided that includes a outer layer elastic material member composed of a silicone resin having C hardness of 20 degrees or less that is in contact with a belt-shaped member disposed on an outer periphery of an inner layer elastic material member, that the elastic body roller possesses a non-stick property or a release property with respect to an adhesive agent layer and frictional force (gripping force) and an anti-wear property with respect to a belt-shaped member, and that the elastic body roller may stably feed and guide a belt-shaped member such as a linerless label or a typical label with a liner.

A second embodiment of the present disclosure describes that, because an elastic body roller has been provided that includes a configuration such that a diameter of the elastic body roller gradually decreases towards both end portions from a center portion, a belt-shaped member such as a linerless label or a typical label with a liner may be stably fed and guided, even in a case where the belt-shaped member has a narrow width.

Embodiments

Figure 11:
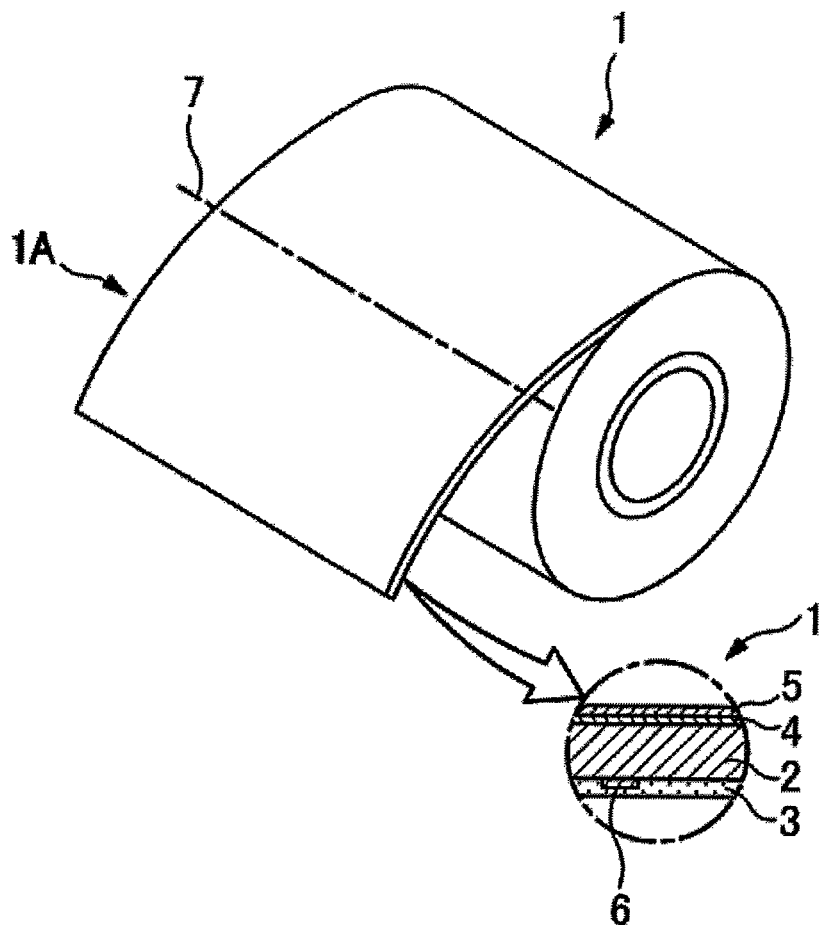
FIG. 11 shows a perspective view of a conventional linerless label 1 wound into a rolled shaped.

Next, the elastic body roller according to a first embodiment of the present disclosure will be described based on FIGS. 1 and 2, e.g., the elastic body roller configured as a platen roller 20 (elastic body roller for label) in thermal printer 8, similarly to the platen roller 17 (see, FIG. 12). However, a description of similar numerals appended to a similar portion of FIGS. 11 and 12 has been omitted.

Figure 1:
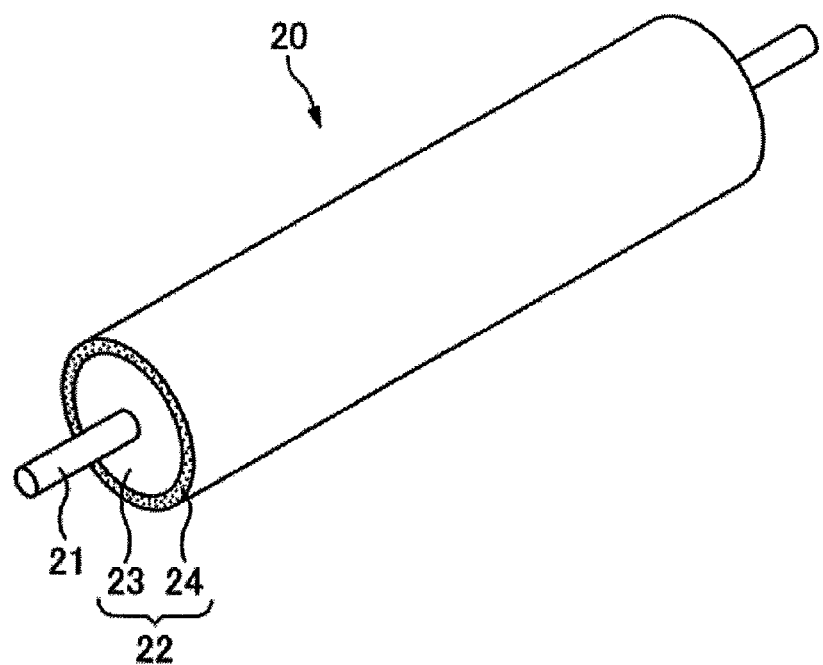
FIG. 1 shows a perspective view of an elastic body roller (platen roller 20) according to a first embodiment of the present disclosure.
Figure 2:
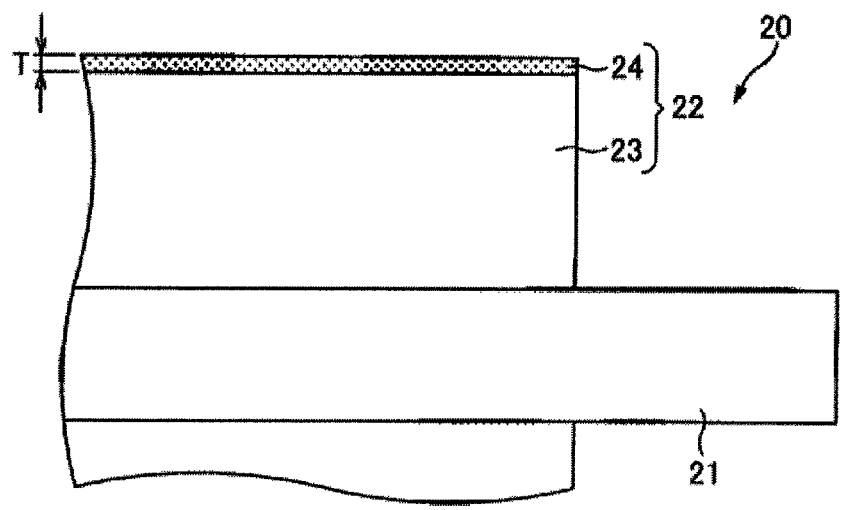
FIG. 2 shows an axial direction essential part enlarged cross-sectional view of the same platen roller 20.

FIG. 1 shows a perspective view of the planten roller 20; and FIG. 2 shows an axial direction essential part enlarged cross-sectional view of the planten roller 20. The planten roller 20 includes a roller shaft 21, and a rotatable elastic material member 22 that integrally liners to a periphery of the roller shaft 21, such that the planten roller 20 feeds the label (e.g., the linerless label 1, see FIG. 11) by bringing the label into contact with the elastic material member 22.

The elastic material member 22 includes a cylindrical inner layer elastic material member 23 disposed on an outer periphery of the roller shaft 21, and an outer layer elastic material member 24 (a coating layer) on the linerless label 1 integrally disposed on an outer periphery of the inner layer elastic material member 23.

The inner layer elastic material member 23 may be composed of a thermoplastic material or a thermosetting elastomeric material.

For example, polyethylene, polypropylene, polymethylpentene, polybutene, crystallized polybutadiene, polybutadiene, styrene-butadiene resin, polyvinyl chloride, polyvinyl acetate, polyvinylidene chloride, ethylene-vinyl acetate copolymer, ethylene-propylene copolymer, ethylene-propylene-diene copolymer, ionomer, polymethyl-methacrylate, polytetrafluoroethylene, ethylene-polytetrafluoroethylene copolymer, polyacetal(polyoxymethylene), polyamide, polycarbonate, polyphenyleneether, polyethylene terephthalate, polybutylene terephthalate, polyarylate, polystyrene, polyethersulfone, polyimide, polyamide-imide, polyphenylenesulfide, polyoxybenzoyl, polyether ether ketone, polyetherimide, polyurethane, polyester, 1,2-polybutadiene, phenol resin, urea resin, melamine resin, benzoguanamine resin, diallyl phthalate resin, alkyd resin, epoxy resin, and silicon resin may be used as a synthetic resin constituting an inner layer elastic material member 23.

In addition, a thermosetting elastomeric material such as a thermosetting silicone rubber, a one-liquid type RTV (Room Temperature Vulcanizing) rubber, a two-liquid type RTV rubber, an LTV (Low Temperature Vulcanizable) silicone rubber, or an oil resistant thermosetting rubber may be used.

The inner layer elastic material member 23 has a hardness of 30 to 80 degrees (rubber hardness according to a Durometer Hardness Testing Method Type A defined in JIS K6253, hereinafter referred to as "A hardness").

In a case where an A hardness is below 30 degrees, the degree of hardness is too soft for the platen roller 20 to feed and guide a belt-shaped member such as the linerless label 1, i.e., a feeding function of the planten roller 20 does not perform properly because of excessive contact and frictional force. Moreover, a printing quality of the thermal printer 8 (see, FIG. 12) is decreased.

In a case where an A hardness exceeds 80 degrees, the degree of hardness is too hard for the platen roller 20, such that the feeding force and the feeding precision thereof are decreased.

The outer layer elastic material member 24 is composed from a silicone resin such as a silicone resin having a C hardness (hardness according to a spring type hardness tester Asker C in accordance with SRIS 0101, hereinafter referred to as "C hardness") of 20 degrees or less.

For example a silicone resin such as silicone gel, a RTV (Room Temperature Vulcanizing) liquid silicone rubber, an LTV (Low Temperature Vulcanizable) liquid silicone rubber, an ultraviolet light curable liquid silicone rubber, or a thermosetting liquid silicone rubber may be used as the silicone rubber.

The silicone resin inherently possesses a non-sticky property or a release property, and the silicone resin may prevent attachment by the adhesive agent layer 3 of the linerless label 1 even in a case where the linerless label 1 or the like is pressed against and fed.

A heat-curable silicone resin may also be easily set to a C hardness by a relatively simple preparation and manufacturing process under thermosetting conditions.

In a case where a C hardness is 20 degrees or less, the silicone resin is in a gel form of the appropriate softness. Of course, the linerless label 1 also possesses a necessary frictional force (gripping power) with respect to a belt-shaped member such as the linerless label 1 and a superior anti-wear property.

However, the planten roller 20 also includes the necessary release property and the gripping force with respect to belt-shaped member such as a linerless label 1 or a label with a liner. Accordingly, the planten roller 20 is able to provide a stable feeding and guidance function.

In a case where the C hardness exceeds 20 degrees, the elastic property of the outer layer elastic material member 24 approached that of a rubber material. Thus, an adhesive property of a surface of the outer layer elastic material member 24 is dramatically increased, and the outer layer elastic material member 24 is easily worn down.

The outer layer elastic material member 24 has a thickness T (see, FIG. 2) of 10 to 100 μm.

In a case where the thickness T is less than 10 μm, unevenness occurs in the thickness of the outer layer elastic material member 24, and obtaining a stable release property or a gripping force is difficult.

In a case where the thickness T exceeds 100 μm, the outer layer elastic material member 24 is compromised as a coating film of the inner layer elastic material member in the planten roller 20, and thus easily broken.

Next, a rolling-angle test is described (measurement method of a rolling-angle) as a test that evaluates a non-stick property (release property) for an elastic body roller according to the present disclosure.

The linerless label 1 is fixed on top of a flat horizontal base, facing upwards towards the adhesive agent layer 3 thereof. An adhesive agent (20 microns thickness) having an emulsion strength adhesiveness is used as an adhesive agent test standard.

The planten roller 20 is disposed on the adhesive agent layer 3 as a test body, a 2 Kg weight is applied for 15 seconds from the top of the planten roller 20, and the planten roller 20 is attached to the linerless label 1.

The weight is removed after 15 seconds, such that a first end portion of a parallel base plate is fixed to an axial line of the planten roller 20 and the base plate continues to slant via a gradual rise in a second end.

Slanting of the base plate ceased at a time point where downward movement of the planten roller 20 begins, and base plate angle of gradient is read out at the above time point.

The angle of gradient (rolling angle) decreases, the easy-to-roll planten roller 20 possesses a high non-stick property, and the linerless label 1 is appropriately fed.

Figure 12:
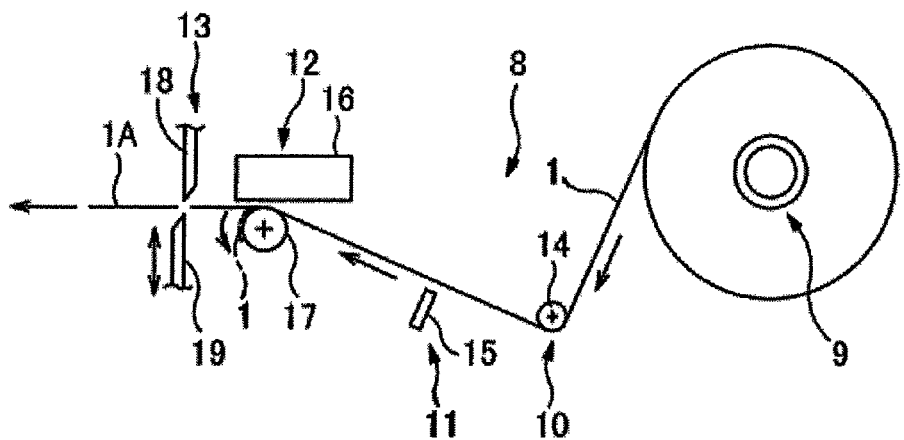
FIG. 12 shows a schematic side view of the same loaded linerless label 1 and a thermal printer 8 for printing variable information such as merchandise information such as a price or a barcode of merchandise or administrative information relating a product or a service where appropriate.

In the test of the present inventors, it is found that even when a rolling angle of the linerless label 1 used in the elastic body roller is no more than 30 degrees, and preferably no more than 15 degrees, after being fed over a distance of 20 Km, the elastic body roller displayed no problems with respect to practical usage as the planten roller 17 or a nip roller in thermal printer 8 (see, FIG. 12).

A linerless label 1 and label with liner feeding test was conducted using the planten roller 20 constructed as described above.

Using a thermosetting silicone rubber having an A hardness of 50 degrees as the inner layer elastic material member 23 having a thickness T of 50 μm at outer periphery, a platen roller 20 according to the present disclosure that forms an outer layer elastic material member 24 composed of a thermosetting silicone rubber (silicone gel) having an C hardness of 50 degrees and a conventional cylindrically-shaped platen roller (comparative product) that does not have the outer layer elastic material member 24 were prepared, and the linerless label 1 and the label with liner were fed.

After the planten roller 20 according to the present disclosure fed the linerless label 1 for a distance of 20 km, the rolling angle that measured was below 15 degrees based on the previously described method. Similarly, after the label with liner was fed for a distance of 20 km, the rolling angle that measured was below 9 degrees. Accordingly, it was understood that a release property at a time of feeding the linerless label and a gripping force at a time of feeding the linerless label were sufficient for the elastic body roller.

Moreover, it was determined that a wear level (a decrease in a diameter) of the elastic body roller due to wear was 1% or less after the linerless label or the label with liner was fed a distance of 20 Km using a elastic body roller in a printer such as the thermal printer 8.

In the abovementioned test, the wear level of the planten roller 20 was 0.05% or less after the linerless label 1 was fed for a distance of 20 Km. Moreover, the wear level of the planten roller 20 at the time the label with liner was fed a distance of 50 Km was 0.5% or less. Accordingly, the planten roller 20 was found to have a sufficient anti-wear property.

On the other hand, the linerless label 1 was wound around a comparative product (planten roller that is not formed with an outer layer elastic material member 24) after being fed for a distance of 0.5 Km. As a result, a measured rolling angle exceeding 70 degrees was found to be incompatible for a usage thereof.

As previously explained, the planten roller 20 having the outer layer elastic material member 24 coated onto the inner layer elastic material member 23 was constructed to have a release property and a gripping force.

Figure 3:
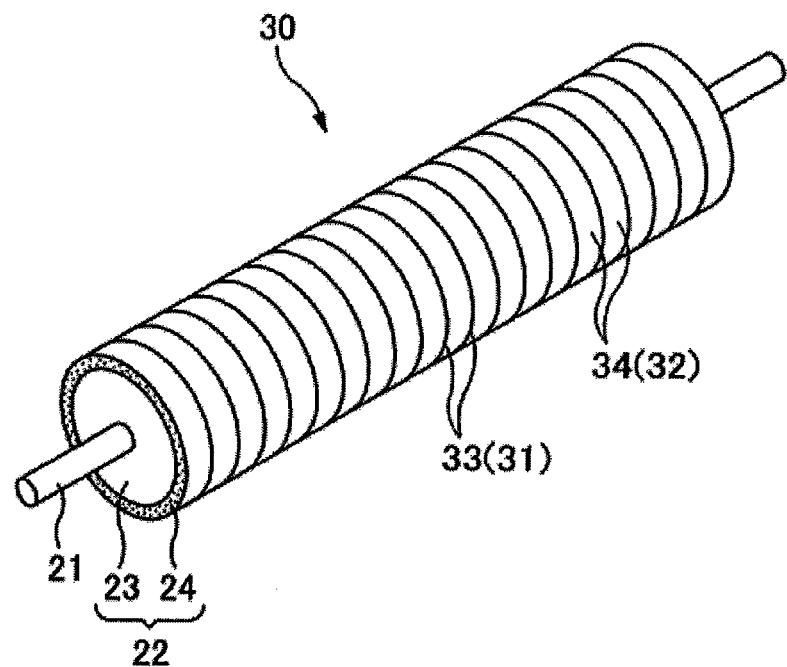
FIG. 3 shows a perspective view of an elastic body roller (platen roller 30) according to a second embodiment of the present disclosure.
Figure 4:
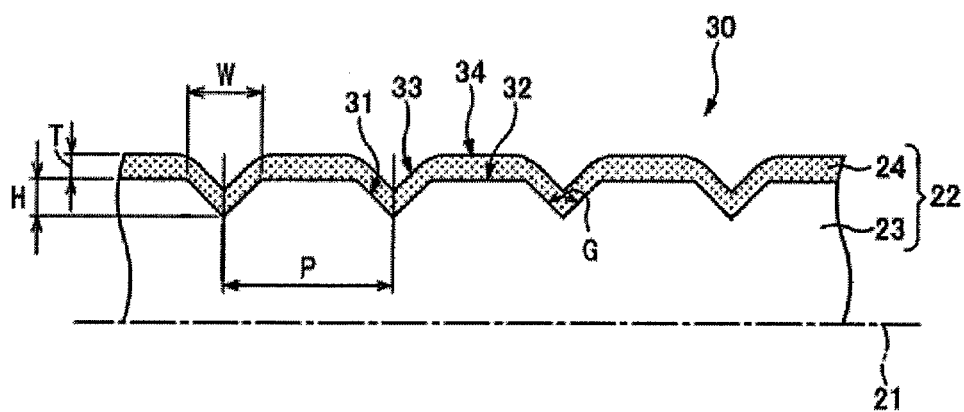
FIG. 4 shows an axial direction essential part enlarged cross-sectional view of the same platen roller 30.

Next, an elastic body roller (planten roller 30) according to a second embodiment of the present disclosure is described with respect FIGS. 3 and 4.

FIG. 3 shows a perspective view of the planten roller 30; and FIG. 4 shows an axial direction essential part enlarged cross-sectional view. A plurality of cross-sectional V-shaped inner layer grooves 31 are formed along a circumferential direction of the planten roller 30, in the inner layer elastic material member 23 (thermosetting silicone rubber having an A hardness of 50 degrees) in the previously-mentioned planten roller 20 (first embodiment of the present disclosure, see FIG. 1). The outer layer elastic material member 24 composed of a thermosetting silicone resin having a C hardness of 15 degrees is formed on an outer periphery thereof.

The inner layer elastic material member 23 is configured with a flat inner layer platform-shaped apex portion between of the inner layer grooves 31.

A plurality of outer layer grooves (coating layer grooves) 33 are formed along a circumferential direction of the inner layer elastic material member 23 such that the position of which conforms to the position of the inner layer grooves 31 formed on the outer layer elastic material member 24 that is formed on the outer periphery of the inner layer elastic material member 23. A cross-section of the outer layer grooves 33 has an approximate V-shape (see, FIG. 4).

The outer layer elastic material member 24 is formed as a flat outer layer platform-shaped apex portion 34 between the outer layer grooves.

The outer layer elastic material member 24 has a thickness T of 10 to 100 μm, similarly to the planten roller 20 according to the first embodiment of the present disclosure.

A multi-angular shape other than a V-shape, such as a U-shape, a conical shape, or a rectangular shape was employed, as the cross-sectional shape of the inner layer grooves 31 and the outer layer grooves 33.

The inner layer grooves 31 have a pitch P of 500 to 1500 μm.

In a case where the pitch P of the inner layer grooves 31 is less than 500 μm, processing the inner layer platform-shaped apex portion 32 formed between the inner layer grooves 31 that are adjacent to each other at an acceptable level is almost impossible.

In a case where the pitch P of the inner layer grooves 31 exceeds 1500 μm, there is a decrease in a percentage of the inner layer grooves 31 and the outer layer grooves 33 with respect to the entire planten roller 30, there tends to be an increase a contact area between a belt-shaped member such as the linerless label 1, and there is a decrease release property of planten roller 30.

The inner layer grooves 31 have a width W of 25 to 1300 μm, and more preferably a width W of 50 to 500 μm.

In a case where the inner layer grooves 31 have a width W of less than 25 μm, a contact area between a belt-shaped member such as the linerless label 1 is increased. As a result, the release property of the planten roller 30 may be decreased.

In a case where the inner layer grooves 31 have a width W exceeding 1300 μm, the planten roller 30 decreases the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

The inner layer grooves 31 have a height H of 25 to 500 μm, and more preferably a height H of 50 to 400 μm.

In a case where the inner layer grooves 31 have a height H of less than 25 μm, a contact area between a platen roller and a belt-shaped member, such as the linerless label 1, is increased. As a result, the release property of the planten roller 30 may be decreased.

In a case where the inner layer grooves 31 have a height H exceeding 500 μm, the planten roller 30 decreases the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

The inner layer grooves 31 have a groove angle G of 50 to 120 degrees, and more preferably a groove angle G of 60 to 100 degrees.

In a case where the inner layer grooves 31 have a groove angle G of less than 50 degrees, a contact area between a belt-shaped member, such as the linerless label 1, is increased. As a result, the release property of the planten roller 30 may be decreased.

In a case where the inner layer grooves 31 have a groove angle G exceeding 120 degrees, the planten roller 30 decreased the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

A feeding test for the linerless label 1 and the label with liner 1 was performed using a planten roller 30 configured as described above.

A outer layer elastic material member 24 was formed from a thermosetting silicone resin (silicone gel) having a C hardness of 15 degrees, such that a thickness T at an outer periphery of the inner layer elastic material member 23 was 50 μm. In addition, the pitch P of the inner layer grooves 31 was configured to be 750 μm, the width W of the inner layer grooves 31 was configured to be 410 μm, the height H of the inner layer grooves 31 was configured to be 350 μm, and the groove angle G of the inner layer grooves 31 was configured to be 60 degrees.

Moreover, only the inner layer grooves 31 were formed based on specifications identical to those mentioned above, a planten roller (comparative product) a was prepared (without an outer layer elastic material member 24), and a feeding test was conducted for a linerless label 1 and label with a liner.

A rolling angle measured according to the previously described method was less than 13 degrees, after feeding the linerless label 1 for a distance of 20 Km via the planten roller 30 according to the present disclosure. Similarly, a rolling angle measured after feeding the linerless label 1 for a distance of 20 Km was less than 9 degrees. It was understood that a release property at a time of feeding the linerless label and a gripping force at a time of feeding the linerless label were sufficient for the elastic body roller.

Moreover, it was determined that a wear level (decrease in a diameter) of the planten roller 30 after the linerless label was fed a distance of 20 Km was 0.05% or less, and the wear level of the planten roller 30 after the linerless label 1 was fed for a distance of 20 Km was 0.5% or less. As a result, the planten roller 30 was found to have a sufficient anti-wear property.

On the other hand, a rolling angle measured for a planten roller (comparative product) formed only with the inner layer grooves 31 (without the outer layer elastic material member 24) after feeding the linerless label 1 for a distance of 1 Km. However, the planten roller remained attached to the adhesive agent layer even in a case where the base plate of the test machine was slanted 70 degrees. Accordingly, it was found that the planten roller failed to include a release property that was sufficient for the intended application thereof. Moreover, it was determined that in cases where a label with a liner was fed, slippage occurred, feeding could not be sustained for a specified distance, and sufficient gripping force was lacking for the planten roller.

In addition, a feeding test for the linerless label 1 and the label with a liner was conducted using a modified planten roller 30. The height H and the width W of the inner layer grooves 31 of the planten roller 30 used in the above test were modified.

A outer layer elastic material member 24 was formed from a thermosetting silicone resin (silicone gel) having a C hardness of 15 degrees, such that a thickness T at an outer periphery of the inner layer elastic material member 23 was 50 μm. In addition, the pitch P of the inner layer grooves 31 was configured to be 750 μm, the width W of the inner layer grooves 31 was configured to be 87 μm, the height H of the inner layer grooves 31 was configured to be 75 μm, and the groove angle G of the inner layer grooves 31 was configured to be 60 degrees.

Moreover, only the inner layer grooves 31 were formed based on specifications identical to those mentioned above, a planten roller (comparative product) lacking an outer layer elastic material member 24 was prepared, and a feeding test was conducted for a linerless label 1 and label with a liner.

A rolling angle measured according to the previously described method was less than 18 degrees, after feeding the linerless label 1 for a distance of 20 Km via the planten roller 30 according to the present disclosure. Similarly, a rolling angle measured after feeding the label with liner for a distance of 20 Km was less than 9 degrees. Accordingly, it was understood that a release property at a time of feeding the linerless label and a gripping force at a time of feeding the label with liner were sufficient for the elastic body roller.

Moreover, it was determined that a wear level (a decrease in a diameter) of the planten roller 30 after the linerless label was fed a distance of 20 Km was 0.05% or less, and the wear level of the planten roller 30 after the linerless label 1 was fed for a distance of 20 Km was 0.5% or less. As a result, the planten roller 30 was found to have a sufficient anti-wear property.

On the other hand, a rolling angle test was performed on a planten roller (comparative product) formed only with the inner layer grooves 31 (without the outer layer elastic material member 24) configured such that the pitch P was 750 μm, the width W was 87 μm, the height H was 75 μm, and the groove angle G was 60 degrees, after feeding the linerless label 1 for a distance of 1 Km. However, the planten roller remained attached to the adhesive agent layer even in a case where the base plate of the test machine was slanted 70 degrees. Accordingly, it was found that the planten roller lacked a release property that could withstand the application thereof. Moreover, it was determined that in cases where a label with a liner was fed, slippage occurred, feeding could not be sustained for a specified distance, and sufficient gripping force was lacking for the planten roller.

As previously explained, an elastic body roller (planten roller) was obtained that included a necessary release property and gripping force for feeding a linerless label or a label with a liner by forming the inner layer grooves 31 on the inner layer elastic material member 23 and by forming the outer layer grooves 33 on the outer layer elastic material member 24.

Figure 5:
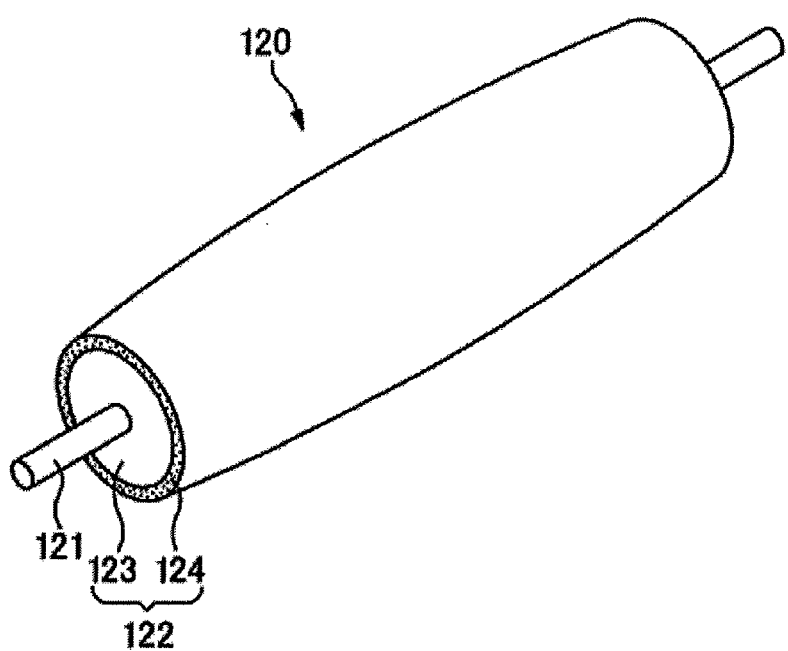
FIG. 5 shows a perspective view of an elastic body roller (platen roller 120) according to a third embodiment of the present disclosure.
Figure 8:
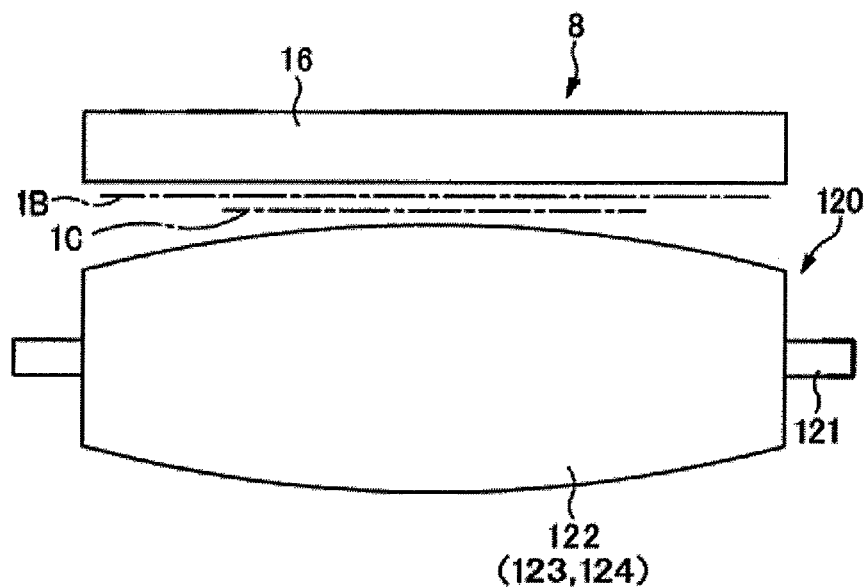

Next, the elastic body roller according to a third embodiment of the present disclosure is described based on FIGS. 5 and 8, e.g., the elastic body roller configured as a platen roller 120 (elastic body roller for label) in thermal printer 8, similarly to the platen roller 17 (see, FIG. 12). However, a description of similar numerals appended to a similar portion of FIGS. 11 and 12 has been omitted.

Figure 6:
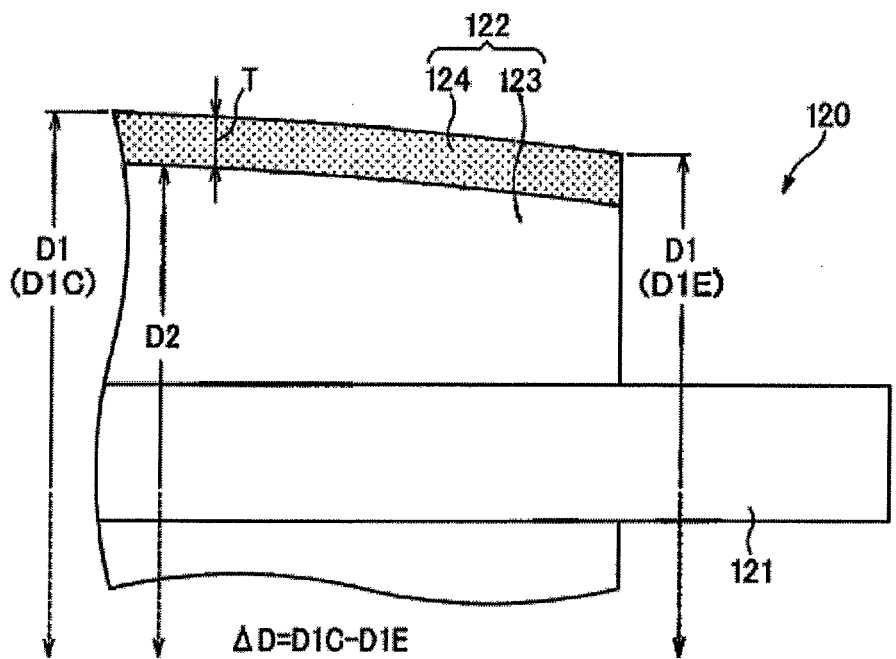
FIG. 6 shows an axial direction essential part enlarged cross-sectional view of the same platen roller 120.

FIG. 5 shows a perspective view of the planten roller 120; and FIG. 6 shows an axial direction essential part enlarged cross-sectional view of the planten roller 120. The planten roller 120 includes a roller shaft 121, and a rotatable elastic material member 122 that integrally liners to a periphery of the roller shaft 120, such that the planten roller 120 feeds the label (e.g., the linerless label 1, see FIG. 11) by bringing the label into contact with the elastic material member 122.

The elastic material member 122 includes a cylindrical inner layer side elastic material member 123 disposed on an outer periphery of the roller shaft 121, and an outer layer elastic material member 124 (outer layer elastic material member) on the linerless label 1 integrally disposed on an outer periphery of the inner layer elastic material member 123.

The inner layer elastic material member 123 may be composed of a thermoplastic member or a thermosetting elastomeric material.

For example, polyethylene, polypropylene, polymethylpentene, polybutene, crystallized polybutadiene, polybutadiene, styrene-butadiene resin, polyvinyl chloride, polyvinyl acetate, polyvinylidene chloride, ethylene-vinyl acetate copolymer, ethylene-propylene copolymer ethylene-propylene-diene copolymer, ionomer, polymethyl-methacrylate, polytetrafluoroethylene, ethylene-polytetrafluoroethylene copolymer, polyacetal(polyoxymethylene), polyamide, polycarbonate, polyphenyleneether, polyethylene terephthalate, polybutylene terephthalate, polyarylate, polystyrene, polyethersulfone, polyimide, polyamide-imide, polyphenylenesulfide, polyoxybenzoyl, polyether ether ketone, polyetherimide, polyurethane, polyester, 1,2-polybutadiene, phenol resin, urea resin, melamine resin, benzoguanamine resin, diallyl phthalate resin, alkyd resin, epoxy resin, and silicon resin may be used as a synthetic resin constituting an inner layer elastic material member 123.

In addition, a thermosetting elastomeric material such as a thermosetting silicone rubber, a one-liquid type RTV (Room Temperature Vulcanizing) rubber, a two-liquid type RTV rubber, an LTV (Low Temperature Vulcanizable) silicone rubber, or an oil resistant thermosetting rubber may be used.

The inner layer elastic material member 123 has a hardness of 30 to 80 degrees (rubber hardness according to a Durometer Hardness Testing Method Type A defined in JIS K6253, hereinafter referred to as "A hardness").

In a case where an A hardness is below 30 degrees, the degree of hardness is too soft for the platen roller 120 to feed and guide a belt-shaped member such as the linerless label 1, i.e., a feeding function of the planten roller 120 does not perform properly because of excessive contact and frictional force. Moreover, a printing quality of the thermal printer 8 (see, FIG. 12) is decreased.

In a case where an A hardness is below 30 degrees, the degree of hardness is too hard for the platen roller 120, such that the feeding force and the feeding precision thereof is decreased.

The outer layer elastic material member 124 is composed from a silicone resin such as a silicone resin having a C hardness (hardness according to a spring type hardness tester Asker C in accordance with SRIS 0101, hereinafter referred to as "C hardness") of 20 degrees or less.

For example a silicone resin such as silicone gel, a RTV (Room Temperature Vulcanizing) liquid silicone rubber, an LTV (Low Temperature Vulcanizable) liquid silicone rubber, an ultraviolet light curable liquid silicone rubber, or a thermosetting liquid silicone rubber may be used as the silicone rubber.

The silicone resin inherently possesses a non-sticky property or a release property, and the silicone resin may prevent attachment by the adhesive agent layer 3 of the linerless label 1 even in a case where the linerless label 1 or the like by being pressed against and fed.

A heat-curable silicone resin may also be easily set to a C hardness by a relatively simple preparation and manufacturing process under thermosetting conditions.

In a case where a C hardness is 120 degrees or less, the silicone resin is in a gel form of the appropriate softness. Of course, the linerless label 1 also possesses a necessary frictional force (gripping power) with respect to a belt-shaped member such as the linerless label 1 and a superior anti-grinding property.

However, the planten roller 120 also includes the necessary release property and gripping force with respect to belt-shaped member such as a linerless label 1 or a label with a liner, and the planten roller 120 may provide a stable feeding and guidance function.

In a case where the C hardness exceeds 20 degrees, the elastic property of the outer layer elastic material member 124 approached that of a rubber material. Thus, an adhesive property of a surface of the outer layer elastic material member 124 is dramatically increased, and the outer layer elastic material member 124 is easily worn down.

In particular, an elastic roller body diameter D1 within a plane perpendicular to the axial direction of the roller shaft 121 of a platen roller 120 (elastic body roller), such as that shown in FIG. 6, gradually decreases from a center portion towards both end portions along an axial direction of the roller shaft 121, i.e., a so-called "barrel shape". The roller shaft 121 is a typical cylindrical shaft, and the diameter along the axial direction is constant.

With respect to the elastic body roller diameter D1, ΔD=D1C−D1E (difference between the elastic body roller center portion diameter D1C in the center portion along the axial direction of the shaft roller and the elastic body roller end portions diameter DIE at the end portions) is 10 to 250 μm.

In addition, the outer layer elastic material member 124 has a uniform outer layer thickness T along the axial direction of the roller shaft 121.

In other words, the inner layer elastic body material 123 that has an elastic roller body diameter D2 within a plane perpendicular to the axial direction of the roller shaft 121 of a platen roller 120 gradually decreases from a center portion towards both end portions along an axial direction of the roller shaft 121.

The outer layer elastic material member 124 has a thickness T (see, FIG. 6) of 10 to 100 μm.

In a case where the thickness T is less than 10 μm, unevenness may occur in the thickness of the outer layer elastic material member 124, and it may be difficult to obtain a stable release property or a gripping force.

In a case where the thickness T exceeds 100 μm, the outer layer elastic material member 124 is compromised as a coating film of the inner layer elastic material member in the planten roller 120, and thus easily broken.

The present disclosure may include a modification other than a third embodiment of the present disclosure, such as that shown in FIG. 6, as the elastic roller body diameter D1 within a plane perpendicular to the axial direction of the roller shaft 121 of a platen roller 120 (elastic body roller) gradually decreases from a center portion towards both end portions along an axial direction of the roller shaft 121.

Figure 7:
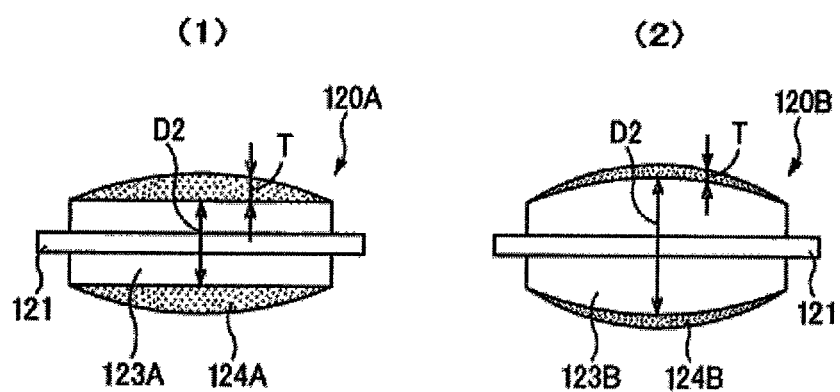
FIG. 7 shows modifications of the same platen roller 120, in which FIG. 7(1) shows an essential part schematic cross-sectional view of a platen roller 120A (elastic body roller) according to a first modification, and FIG. 7(2) shows an essential part schematic cross-sectional view of a platen roller 120B (elastic body roller) according to a second modification.

For example, FIG. 7 shows the abovementioned modifications, such that FIG. 7(1) shows an essential part schematic cross-sectional view of a planten roller 120A (elastic body roller) according to a first modification, and FIG. 7(2) shows an essential part schematic cross-sectional view of a planten roller 120B (elastic body roller) according to a second modification.

The inner layer elastic material member 123A in the planten roller 120A, as shown in FIG. 7(1), has an inner layer elastic material member diameter D2 within a plane perpendicular to the axial direction of the roller shaft 121 that gradually decreases from a center portion towards both end portions along an axial direction of the roller shaft 121.

On the other hand, the outer layer elastic material member 124A has a outer layer thickness T within a plane perpendicular to the axial direction of the roller shaft 121 that gradually decreases from a center portion towards both end portions along an axial direction of the roller shaft 121.

The inner layer elastic material member 123B in the planten roller 120B, as shown in FIG. 7(2), has an inner layer elastic material member diameter D2 within a plane perpendicular to the axial direction of the roller shaft 121 of a platen roller 120 that gradually decreases from a center portion towards both end portions along an axial direction of the roller shaft 121.

Moreover, the coating layer 124B has a coating layer thickness T that gradually decreases along an axial direction of the roller shaft 121.

A rolling angle test is described (measurement method of a roll-angle) as a test that evaluates a non-stick property (release property) for an elastic body roller according to the present disclosure.

The linerless label 1 is fixed on top of a flat horizontal base, facing upwards towards the adhesive agent layer 3 thereof.

The planten roller 120 is disposed on the adhesive agent layer 3 as a test body, a 2 Kg weight is applied for 15 seconds from the top of the planten roller 120, and the planten roller 120 is attached to the linerless label 1.

The weight is removed after 15 seconds, such that a first end portion of a parallel base plate is fixed to an axial line of the planten roller 120 and the base plate continued to slant via a gradual rise in a second end.

Slanting of the base plate ceased at a time point where downward movement of the planten roller 120 begins, and base plate angle of gradient (rolling angle) is read out at the above time point.

The angle of gradient (rolling angle) decreased, the easy-to-roll planten roller 20 possesses a high non-stick property, and the linerless label 1 is appropriately fed.

In the test of the present inventors, it is found that even when a rolling angle of the linerless label 1 used in the elastic body roller is no more than 30 degrees, and preferably no more than 15 degrees, after being fed over a distance of 20 Km, the elastic body roller displayed no problems with respect to practical usage as the planten roller 17 or a nip roller in thermal printer 8 (see, FIG. 12).

A linerless label 1 and label with liner feeding test was conducted using the planten roller 120 constructed as described above.

Using a thermosetting silicone rubber as the inner layer elastic material member 123 having a center portion diameter of 10.15 mm and an end portion diameter of 10.05 mm, a platen roller 120 was prepared by forming a outer layer elastic material member 124 composed of a thermosetting silicone rubber (silicone gel) having an C hardness of 50 degrees, such that the outer layer elastic material member had a constant outer layer thickness T of 50 μm around a periphery of the planten roller 120.

The planten roller 120 according to the present disclosure and a conventional cylindrical planten roller (comparative product) that lacked a outer layer elastic material member 124 were prepared, and the linerless label 1 and the label with a liner were fed.

After the planten roller 120 according to the present disclosure fed the linerless label 1 and the label with liner for a distance of 20 km, the rolling angle that was measured for the linerless label 1 was below 15 degrees and the rolling angle that was measured for the label with liner was below 9 degrees. Accordingly, it was understood that in both instances there was sufficient release property and a gripping force for the elastic body roller.

Moreover, it is determined that a wear level of the elastic body roller diameter due to wear was 1% or less after the linerless label or the label with liner was fed a distance of 20 Km using a elastic body roller in a printer such as the thermal printer 8.

In the abovementioned test, The wear level of the planten roller 120 was 0.05% or less after the linerless label 1 was fed for a distance of 20 Km. Moreover, the wear level of the planten roller 120 at the time the label with liner was fed a distance of 50 Km was 0.5% or less.

On the other hand, the linerless label 1 was wound around a comparative product (conventional planten roller that was not formed with an outer layer elastic material member 124) after being fed for a distance of 0.5 Km. As a result, a measured rolling angle exceeding 70 degrees was found to be incompatible for a usage thereof.

As previously explained, the planten roller 120 having the outer layer elastic material member 124 coated onto the inner layer elastic material member 123 is constructed to have a release property and gripping force.

FIG. 8 shows an essential part side view as seen from a feeding direction of the linerless label 1 of the planten roller 120 and the thermal head 16 (see, FIG. 8) on the thermal printer 8 (see, FIG. 12) or the like. In a case where a broad-sized width linerless label 1B was fed and printed by sandwiching between the thermal head 16 and the planten roller 120, because the linerless label 1B was fed within the width of the planten roller 120, the thermal head 16 and the planten roller 120 do not come into direct contact with each other and no problems arise in the printing and feeding thereof.

On the other hand, even in a case where a narrow width linerless label 1C (e.g., width 20 mm) was fed and printed by sandwiching between a 4-inch thermal head 16 and the planten roller 120 (effective print width 104 mm and maximum normal paper width 118 mm), the thermal head 16 and the planten roller 120 either do not come into contact with each other or only lightly make contact with each other, such that the same printing and feeding were achieved without any problems. Accordingly, the planten roller 120 has a so-called "barrel shape" so long as the narrow width linerless label 1C was fed in the center portion of the planten roller 120 according to the width of the planten roller 120.

Moreover, even in a case where a narrow width label with liner (e.g., width of 23 mm) was fed and printed by sandwiching between the 4-inch thermal head 16 and the planten roller 120, because the linerless label 1B was fed within the width of the planten roller 120, the necessary gripping force is achieved, and the same printing and feeding were achieved without any problems.

Next, an elastic body roller (planten roller 130) according to a fourth disclosure will be described based on FIGS. 9 and 10.

Figure 9:
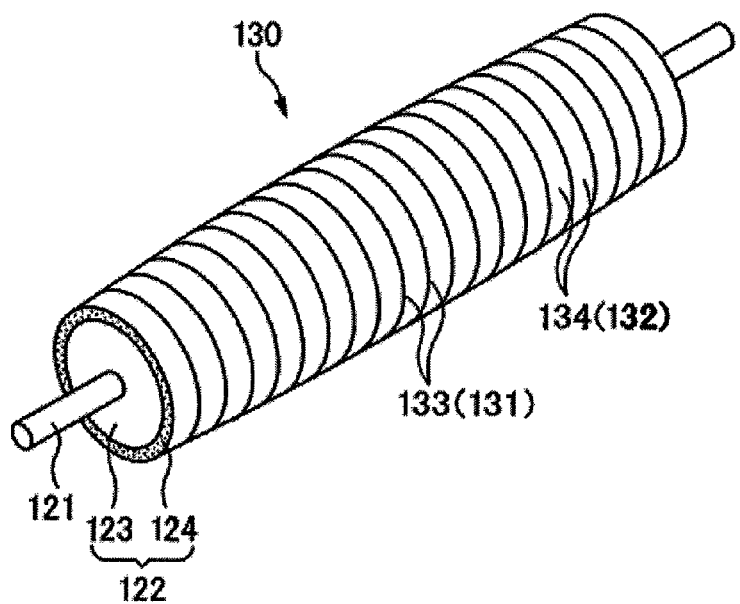
FIG. 9 shows a perspective view of an elastic body roller (platen roller 130) according to a fourth embodiment of the present disclosure.
Figure 10:
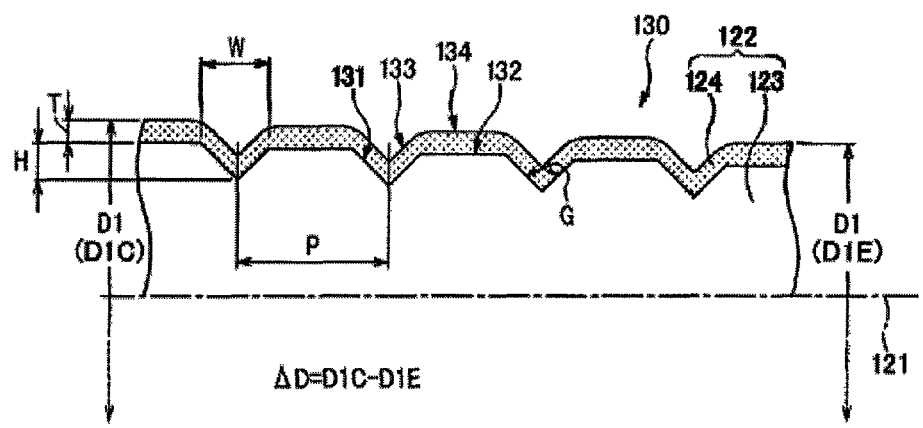
FIG. 10 shows an axial direction essential part enlarged cross-sectional view of the same platen roller 130.

FIG. 9 shows a perspective view of a planten roller 130; and FIG. 10 shows an axial direction essential part enlarged cross-sectional view of the planten roller 130. The planten roller 130 having an elastic roller body diameter D1 within a plane perpendicular to the axial direction of the roller shaft 121 of a planten roller 120 (elastic body roller), similar to the abovementioned planten roller 120 (third embodiment, FIG. 5), gradually decreases from a center portion towards both end portions along an axial direction of the roller shaft 121, such that the planten roller 130 is formed into a so-called "barrel shape".

However, the elastic body roller diameter D1 gradually decreases from a center portion towards both end portions along an axial direction of the roller shaft 121.

FIG. 10 shows an essential part comprising elastic body roller diameter D1 that gradually decreases from a left center part of the figure to a right part of the figure.

Moreover, with respect to planten roller 130 (elastic body roller), the $\Delta D = D1C - D1E$ (difference between the elastic body roller center portion diameter D1C in the center portion along the axial direction of the shaft roller and the elastic body roller end portion diameter DIE at the end portions), similar to the abovementioned planten roller 120, is 10 to 180 μm.

In addition, with respect to the planten roller 130, a plurality of cross-sectional (more precise horizontally cut cross-section that includes a center line of the planten roller 120) V-shaped inner layer grooves 131 are formed along a circumferential direction of the inner layer elastic material member 123 in the planten roller 120 (third embodiment, FIG. 5).

The inner layer elastic material member 123 is formed as a flat inner layer platform-shaped apex portion between each of the inner layer grooves 131.

The inner layer grooves 131 are formed in the outer layer elastic material member 124, and a plurality of outer layer grooves 133 having a substantially V-shaped cross-section are formed along the circumference of the outer layer elastic material member 124 at a matching location on an upper layer side of the inner layer grooves 131.

The outer layer elastic material member 124 is formed as a flat outer layer platform-shaped apex portion 134 between the outer layer grooves 133.

The outer layer elastic material member 124 has a substantially uniform outer layer thickness T in an axial direction of the roller shaft 121, and has the outer layer thickness T 10 to 100 μm.

A multi-angular shape other than a V-shape, such as a U-shape, a conical shape, or a rectangular shape was employed, as the cross-sectional shape of the inner layer grooves 131 and the outer layer grooves 133.

The inner layer grooves 131 have a pitch P of 500 to 1500 μm.

In a case where the pitch P of the inner layer grooves 131 is less than 500 μm, processing the inner layer platform-shaped apex portion 132 formed between the inner layer grooves 131 that are adjacent to each other at an acceptable level was almost impossible.

In a case where the pitch P of the inner layer grooves 131 exceeded 1500 μm, there is a decrease in a percentage of the inner layer grooves 131 and the outer layer grooves 133 with respect to the entire planten roller 130, there tends to be increase in a contact area between a belt-shaped member such as the linerless label 1, and there tends to be a decrease in a release property of planten roller 130.

The inner layer grooves 131 have a width W of 25 to 1300 μm, and more preferably a width W of 50 to 500 μm.

In a case where the inner layer grooves 131 have a width W of less than 25 μm, a contact area between a belt-shaped member such as the linerless label 1 is increased. As result, the release property of the planten roller 130 may be decreased.

In a case where the inner layer grooves 131 have a width W exceeding 1300 μm, the planten roller 130 decreased the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

The inner layer grooves 131 have a height H of 25 to 500 μm, and more preferably a height H of 50 to 400 μm.

In a case where the inner layer grooves 131 have a height H of less than 25 μm, a contact area between a belt-shaped member such as the linerless label 1 is increased. As result, the release property of the planten roller 130 may be decreased.

In a case where the inner layer grooves 131 have a height H exceeding 500 μm, the planten roller 130 decreases the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

The inner layer grooves 131 have a groove angle G of 50 to 120 degrees, and more preferably a groove angle G of 60 to 100 degrees.

In a case where the inner layer grooves 131 have a groove angle G of less than 50 degrees, a contact area between a belt-shaped member such as the linerless label 1 is increased. As result, the release property of the planten roller 130 may be decreased.

In a case where the inner layer grooves 131 have a groove angle G exceeding 120 degrees, the planten roller 130 decreased the pressing force of a part on the linerless label 1 or the like by the application of the appropriate pressure from the adhesive agent layer 3 side, such that printing precision may be decreased with respect to a label piece 1A in a printing part 12 of the thermal printer 8, e.g., printing omissions or the like may occur.

A feeding test for the linerless label 1 and the label with liner 1 was performed, similar with planten roller 120 (see, FIG. 5) according to a third embodiment, using a planten roller 130 configured as described above.

A outer layer elastic material member 124 was formed from a thermosetting silicone resin (silicone gel) having a C hardness of 15 degrees, such that a thickness T at an outer periphery of the inner layer elastic material member 123 was 50 μm. In addition, the pitch P of the inner layer grooves 131 was configured to be 750 μm, the width W of the inner layer grooves 131 was configured to be 410 μm, the height H of the inner layer grooves 131 was configured to be 350 μnm, and the groove angle G of the inner layer grooves 131 was configured to be 60 degrees.

Moreover, only the inner layer grooves 131 were formed based on specifications identical to those mentioned above, a planten roller (comparative product) lacking a outer layer elastic material member 124 was prepared, and a feeding test was conducted for a linerless label 1 and label with a liner.

After the planten roller 130 according to the present disclosure fed the linerless label 1 and the label with liner for a distance of 20 km, the rolling angle that was measured for the linerless label 1 was below 13 degrees and the rolling angle that was measured for the label with liner was below 9 degrees. Accordingly, it was understood that in both instances there was sufficient release property and a gripping force for the elastic body roller.

On the other hand, even in a case where a rolling angle measured for a planten roller formed only with the inner layer grooves 131 (without the outer layer elastic material member 124) after feeding the linerless label 1 for a distance of 1 Km exceeded 70 degrees, the planten roller remained attached to the adhesive agent layer. Accordingly, it was found that the planten roller failed to include a release property that was sufficient for the intended application thereof. Moreover, it was determined that in cases where a label with a liner was fed, slippage occurred, feeding could not be sustained for a specified distance, and sufficient gripping force was lacking for the planten roller.

In addition, a feeding test for the linerless label 1 and the label with a liner was conducted using a modified planten roller 130. The height H and the width W of the inner layer grooves 131 of the planten roller 130 used in the above test were modified.

An outer layer elastic material member 124 in the planten roller 130 was formed from a thermosetting silicone resin (silicone gel) having a C hardness of 15 degrees, such that a thickness T at an outer periphery of the inner layer elastic material member 123 was 50 μm. In addition, the pitch P of the inner layer grooves 131 was configured to be 750 μm, the width W of the inner layer grooves 131 was configured to be 87 μm, the height H of the inner layer grooves 131 was configured to be 75 μm, and the groove angle G of the inner layer grooves 131 was configured to be 60 degrees.

Moreover, only the inner layer grooves 131 that were formed based on specifications identical to those mentioned above, a planten roller (comparative product) lacking an outer layer elastic material member 124 was prepared, and a feeding test was conducted for a linerless label 1 and label with a liner.

In a case where a rolling angle was measured for a planten roller 130 having a decreased width W (87 μm) and a decreased height H (75 μm) after feeding the linerless label 1 for a distance of 20 Km via the previously mentioned method, the rolling angle was less than 18 degrees. Similarly, in a case where the rolling angle was measured after feeding the label with liner for a distance of 20 Km, the rolling angle was less than 9 degrees. Accordingly, it was understood that a release property at a time of feeding the linerless label and a gripping force at a time of feeding the label with liner were sufficient for the elastic body roller.

Moreover, it was determined that a wear level of the planten roller 130 after the linerless label was fed a distance of 20 Km was 0.05% or less, and the wear level of the planten roller 130 after the linerless label 1 was fed for a distance of 20 Km was 0.5% or less. As a result, the planten roller 130 was found to have a sufficient anti-wear property.

On the other hand, a similar rolling angle test was performed on a planten roller (comparative product) formed only with the inner layer grooves 131 (without the outer layer elastic material member 124), configured such that the pitch P was 750 μm, the width W was 87 μm, the height H was 75 μm, and the groove angle G was 60 degrees, after feeding the linerless label 1 for a distance of 1 Km. However, the planten roller remained attached to the adhesive agent layer even in a case where the base plate of the test machine was slanted 70 degrees. Accordingly, it was found that the planten roller lacked a release property that could withstand the application thereof. Moreover, it was determined that in cases where a label with liner was fed, slippage occurred, feeding could not be sustained for a specified distance, and sufficient gripping force was lacking for the planten roller.

As previously explained, an elastic body roller (planten roller) was obtained that included a necessary release property and gripping force for feeding a linerless label or a label with a liner by forming the inner layer grooves 131 on the inner layer elastic material member 123 and by forming the outer layer grooves 133 on the outer layer elastic material member 124.

In addition, in a case where printing and feeding was accomplished by being able to load either a broad width linerless label 1B or a narrow width linerless label 1C onto a thermal printer 8 or the like, similar to a description based on FIG. 8, even in a case where the linerless label 1C was loaded, because both end portion sides of the planten roller 120 had a smaller diameter when compared with that of the center portion thereof, the thermal head 16 and the planten roller 130 did not come into contact or make only light contact with each other at both end portions of the linerless label 1C. Accordingly, no problems arose in the printing and feeding thereof.

Even in a case of planten roller 120 (see, FIG. 5) and planten roller 130 (see, FIG. 9), the stable feeding of the linerless label 1 (see, FIG. 11), the broad width linerless label 1B, the narrow width linerless label 1C, and a label with liner may be accomplished even if a region of an axial direction center portion of the roller shaft 121 was configured to be partially flat.

The first and second embodiments of the present invention have been descriptions using a printer planten roller as an example of an elastic body roller. However, various rollers may be used, e.g., a guide roller, or a nip roller. In addition to the above, the planten roller may be employed for an adhesive (press-on) roller with a label self-adhesive function, printers or various coaters, a guide roller for a tape-shaped product processing device, and a drive roller.

What is claimed is:

1. An elastic body roller for feeding a belt-shaped member, the elastic body roller comprising:
    a roller shaft; and
    an elastic material member surrounding the roller shaft, the elastic material member configured to feed the belt-shaped member by making contact with the belt-shaped member, the elastic material member including:
        an inner layer elastic material member disposed on an outer periphery of the roller shaft, the inner layer elastic material member having a rubber hardness of 30 to 80 degrees according to a Durometer Hardness Testing Method Type A defined in JIS K6253, the inner layer elastic material member being configured with a plurality of inner layer grooves along a circumferential direction thereof, the inner layer grooves having a width of 25 to 1300 μm, the inner layer grooves having a height of 25 to 500 μm, the inner layer grooves having a V-shaped cross-section and a groove angle of 50 to 120 degrees; and
        an outer layer elastic material member disposed on an outer periphery of the inner layer elastic material member, the outer layer elastic material member configured to make contact with the belt-shaped member, the outer layer elastic material member being formed from a silicone resin having a hardness of 20 degrees or less based on a spring type hardness tester Asker C in accordance with SRIS 0101, the outer layer elastic material member having a thickness of 10 to 100 μm, and the outer layer elastic material member is configured with a plurality of outer layer grooves along a circumferential direction thereof.

2. The elastic body roller according to claim 1, wherein the silicone resin has a thermosetting property.

3. The elastic body roller according to claim 1, wherein the inner layer elastic material member is formed from thermoplastic material or a thermosetting elastomeric material.

4. The elastic body roller according to claim 1, wherein the inner layer elastic material member is configured with a flat inner layer platform-shaped apex portion between of the inner layer grooves.

5. The elastic body roller according to claim 1, wherein the outer layer elastic material member is configured with a flat outer layer platform-shaped apex portion between the outer layer grooves.

6. The elastic body roller according to claim 1, wherein the inner layer grooves have a pitch of 500 to 1500 μm.

7. The elastic body roller according to claim 1, wherein the outer layer grooves have a substantially V-shaped cross-section are formed along the circumference of the outer layer elastic material member at a matching location on an upper layer side of the inner layer grooves.

8. The elastic body roller according to claim 1, wherein the inner layer elastic material member has an inner layer elastic body roller diameter in a plane perpendicular to the axial direction of the roller shaft that gradually decreases toward both of the end portions from the center portion of the elastic body roller along the axial direction of the roller shaft.

9. The elastic body roller according to claim 1, wherein the outer layer elastic material member has a coating thickness in a plane perpendicular to the axial direction of the roller shaft that gradually decreases toward both of the end portions from the center portion along the axial direction of the roller shaft.

10. The elastic body roller according to claim 1, wherein the elastic body roller diameter of the elastic body roller gradually decreases toward both of the end portions from the center portion along the axial direction of the roller shaft.

11. The elastic body roller according to claim 1, wherein the elastic body roller diameter of the elastic body roller decreases step-wise toward both of the end portions from the center portion along the axial direction of the roller shaft.

12. The elastic body roller according to claim 1, wherein a difference between an elastic body roller center portion diameter at the center portion along the axial direction of the roller shaft and an elastic body roller end portion diameter at both of the end portions is 10 to 250 μm, with respect to the elastic body roller diameter in the plane perpendicular to the axial direction of the roller shaft of the elastic roller.

* * * * *